(12) United States Patent
Mangnall et al.

(10) Patent No.: US 8,341,451 B2
(45) Date of Patent: Dec. 25, 2012

(54) CLOCK CONFIGURATION

(75) Inventors: Jon Mangnall, Bristol (GB); Peter Cumming, Gloucestershire (GB)

(73) Assignee: Icera Inc., Wilmington, DE (US)

( * ) Notice: Subject to any disclaimer, the term of this patent is extended or adjusted under 35 U.S.C. 154(b) by 677 days.

(21) Appl. No.: 12/428,728

(22) Filed: Apr. 23, 2009

(65) Prior Publication Data

US 2009/0273378 A1 Nov. 5, 2009

(30) Foreign Application Priority Data

Apr. 30, 2008 (GB) .................................. 0807924.6

(51) Int. Cl.
*G06F 1/00* (2006.01)
*G06F 9/00* (2006.01)

(52) U.S. Cl. ................................. 713/500; 713/1; 713/2

(58) Field of Classification Search .................. 713/1, 2, 713/500
See application file for complete search history.

(56) References Cited

U.S. PATENT DOCUMENTS

| | | | | |
|---|---|---|---|---|
| 5,572,716 A * | 11/1996 | Meisner | ........................ | 713/500 |
| 6,442,704 B1 * | 8/2002 | Morimoto et al. | ............ | 713/500 |
| 6,640,195 B1 * | 10/2003 | Bayerl et al. | ..................... | 702/75 |
| 7,216,250 B2 * | 5/2007 | Matsuoka et al. | ............ | 713/503 |
| 7,526,666 B1 * | 4/2009 | Soni | .............................. | 713/500 |
| 2003/0006849 A1 * | 1/2003 | Janssen | ........................... | 331/78 |
| 2003/0011438 A1 * | 1/2003 | Uzunoglu | ...................... | 331/100 |
| 2003/0199260 A1 * | 10/2003 | Casey et al. | ................ | 455/150.1 |
| 2004/0263259 A1 * | 12/2004 | Iadanza et al. | .................. | 331/16 |
| 2006/0133553 A1 * | 6/2006 | Convent et al. | ............... | 375/354 |
| 2008/0222440 A1 * | 9/2008 | Jones et al. | .................... | 713/400 |

FOREIGN PATENT DOCUMENTS

WO    WO2006117562    11/2006

* cited by examiner

*Primary Examiner* — Thomas Lee
*Assistant Examiner* — Robert Cassity

(57) ABSTRACT

A circuit and method for determining the frequency of a first oscillating reference signal generated by a first reference oscillator. The circuit comprises: a second reference oscillator arranged to generate a second oscillating reference signal having a known frequency, a boot memory storing boot code comprising clock configuration code, and a processor coupled to the boot memory and the second reference oscillator. The processor is arranged to execute the boot code from the boot memory upon booting, wherein when executed the clock configuration code operates the processor to determine the frequency of the first reference signal by reference to the second reference signal.

29 Claims, 2 Drawing Sheets

CLOCK CONFIGURATION

PRIORITY CLAIM

The present application claims the priority of Great Britain Patent Application No. GB 0807924.6 filed Apr. 30, 2008.

FIELD OF THE INVENTION

The present invention relates to a method and apparatus for configuring clock circuitry.

BACKGROUND OF THE INVENTION

An electronic circuit having a processor will require clock circuitry such as a phase-locked loop (PLL) which generates a clock signal for the circuit. The clock signal may subsequently be divided and/or branched multiple times throughout the circuit, but the PLL is usually the master source of the clock signal.

A PLL generates the clock signal by reference to a reference oscillator, typically a crystal oscillator mounted on the same board as the processor chip. For a processor, the reference oscillator frequency is typically of a lower order of magnitude than the clock frequency to be generated.

The PLL works by branching off its output clock signal and dividing the frequency by the desired factor, then feeding back the divided clock signal for comparison with the phase of the reference signal. An error signal is generated based on the comparison, and used to adjust the output clock frequency. Thus the output clock signal is held at a frequency which is higher than the reference frequency by the division factor of the loop.

Because processor design is a long and expensive process, it is desirable to design a processor with different applications and/or customers in mind, and/or to anticipate possible future modifications. One aspect of this design philosophy is to design a chip that can be relatively easily modified at the manufacturing stage to accommodate different frequency reference oscillators. This is currently done by providing the chip with one or more fuse latches such as electronically programmable "e-fuses". Typically each fuse represents one bit, e.g. with a blown fuse representing a logic-one and an un-blown fuse representing a logic-zero, such that a binary value can be written into one or more of such latches. The PLL is arranged so that the division factor in its feedback loop is dependent on the value written to the fuse latches at chip manufacture, thus allowing different frequency reference oscillators to be chosen for a given output frequency.

However, this technique is still not as flexible as it could be, because the choice must be permanently fixed upon manufacture. It would be advantageous to provide a more flexible mechanism.

SUMMARY OF THE INVENTION

According to one aspect of the present invention, there is provided a circuit for determining the frequency of a first oscillating reference signal generated by a first reference oscillator, the circuit comprising: a second reference oscillator arranged to generate a second oscillating reference signal having a known frequency; a boot memory storing boot code comprising clock configuration code; and a processor coupled to the boot memory and the second reference oscillator, arranged to execute the boot code from the boot memory upon booting, wherein when executed the clock configuration code operates the processor to determine the frequency of the first reference signal by reference to the second reference signal.

Thus by providing for discovering the reference frequency in the boot, the present invention is more flexible and "future-proof" in terms of the choice of reference oscillator. This advantageously allows customers a choice in the reference oscillator they use without the need to specifically tailor the circuit in that respect for each customer. It can also allow a customer to be able to change their design at a later stage.

In a preferred embodiment the circuit may comprise a real-time clock for measuring time in seconds, the real-time clock comprising the second reference oscillator and being arranged to use the frequency of the first signal as a reference, and the frequency of the second reference signal may be $2^n$ oscillations per second where n is an integer.

Thus in embodiments the present invention advantageously re-uses circuitry that is included in the circuit for other reasons, i.e. the real-time clock crystal. Reference oscillators for real-time clocks tend to be less accurate than the reference oscillators for clocking the circuit, particularly for clocking the processor. Thus although the frequency of the real-time clock's oscillator is nominally known, the real-time clock still needs to be calibrated. However, according to embodiments of the present invention, the inventors have recognised that the real-time clock is nonetheless accurate enough to perform a "reverse" calibration and make a reasonably good decision about the unknown first reference frequency.

Preferably the circuit may comprise calibration means arranged to calibrate the real-time clock by determining the frequency of the second reference signal to a greater accuracy than initially known by reference to the determined frequency of the first reference signal. The frequency of the first reference signal may be one of a predetermined set of quantised values, and the boot configuration code may determine the frequency of the first reference signal by reference to the set of quantised values. The quantisation may be spaced more widely than the initially known accuracy of the frequency of the second reference oscillator.

The frequency of the second reference signal may be lower than the frequency of the first reference signal. The frequency of the second reference signal may be at least ten times lower than the frequency of the first reference signal. The frequency of the second reference signal may be nominally 32.768 kHz.

In further preferred embodiments, the circuit may comprise clock circuitry arranged to generate by reference to the first reference signal a clock signal having a frequency greater than the frequency of the first reference signal by a controllable factor; and when executed the clock configuration code may operate the processor to set said factor in dependence on the determined frequency of the first reference signal.

Thus the boot code can advantageously support different configurations of clock circuitry, e.g. different configurations of PLL, depending on the discovered reference frequency. This advantageously allows customers a choice in the reference oscillator they use as a reference for their clock, again without having to specifically tailor the circuit. For example, it may allow the chip's main frequency to be configured without the need to blow fuses, and allow flexibility in the board design and choice of main crystal.

In further preferred embodiments, the circuit may comprise at least one fuse latch coupled to the processor for storing an indication of the frequency of the first reference signal; and may comprise selection means coupled to the processor, the selection means being arranged to configure the processor into a selected one of: a fused mode of operation in which said factor is determined by an indication written into said at least one fuse latch, and a discovery mode of operation in which the factor is determined by reference to the second reference signal.

Discovering the frequency will result in a slightly slower to boot but is more flexible, whilst simply specifying the frequency in the fuses will allow a faster boot but is less flexible. Given this trade-off, it is therefore advantageous to provide the circuit with different modes in order to allow a choice between the two possibilities.

In further embodiments, at least the clock circuitry and processor may be integrated onto the same chip, and at least the first reference oscillator may be mounted externally to the chip. The boot memory may comprise an on-chip boot ROM storing said boot code.

The clock circuitry may be connected as the master clock for the chip. The clock circuitry may be arranged to clock the processor using said clock signal.

The circuit may comprise a radio interface coupled to the processor for communicating over a wireless cellular network, wherein the clock circuitry may be arranged to clock the radio interface using said clock signal. The boot code may comprise code for configuring the processor for communicating over the wireless network via said radio interface.

The clock circuitry may comprise a phase-locked loop.

The frequency of the clock signal may be at least ten times the frequency of the first reference signal.

The clock circuitry may comprise an addressable register for setting said factor, and when executed the clock configuration code may operate the processor to write said factor to the register in dependence on the determined first frequency.

The first reference oscillator may be independently oscillating. The first reference oscillator may be a crystal oscillator. The second reference oscillator may be independently oscillating. The second reference oscillator may be a crystal oscillator.

The circuit may comprise timing circuitry by which the processor is coupled to the first and second reference oscillators, wherein when executed the clock configuration code may operate the processor to determine the frequency of the first reference signal by reference to the second reference signal using the timing circuitry.

According to another aspect of the present invention, there is provided a method of determining the frequency of a first oscillating reference signal generated by a first reference oscillator, configuring clock circuitry, the method comprising: generating a second oscillating reference signal having a second frequency; and executing boot code upon booting a processor, wherein the execution of the boot code comprises executing clock configuration code to determine the frequency of the first reference signal by reference to the second reference signal.

According to another aspect of the present invention, there is provided a processor chip comprising: an input for receiving a first oscillating reference signal having a first frequency from a first reference oscillator; an input for receiving a second oscillating reference signal having a second, known frequency from a second reference oscillator; a boot memory storing boot code comprising clock configuration code; and an execution unit coupled to the boot memory and the second reference oscillator, arranged to execute the boot code from the boot memory upon booting, wherein when executed the clock configuration code operates the processor to determine the first frequency by reference to the second reference signal.

According to another aspect of the present invention, there is provided user equipment comprising: a first reference oscillator arranged to generate a first oscillating reference signal having a first frequency; a second reference oscillator arranged to generate a second oscillating reference signal having a second, known frequency; a boot memory storing boot code comprising clock configuration code; and a processor coupled to the boot memory, first reference oscillator and second reference oscillator, arranged to execute the boot code from the boot memory upon booting, wherein when executed the clock configuration code operates the processor to determine the first frequency by reference to the second reference signal.

According to another aspect of the present invention, there is provided a boot code product for determining the frequency of a first oscillating reference signal generated by a first reference oscillator, the boot code comprising code which when executed on a processor performs the steps of: booting the processor; and as part of the booting, determining the frequency of the first reference signal by reference to a second oscillating reference signal having a second, known frequency generated by a second reference oscillator.

For a better understanding of the present invention and to show how it may be carried into effect, reference will now be made by way of example to the accompanying drawings.

DETAILED DESCRIPTION OF PREFERRED EMBODIMENTS

Figure 1:
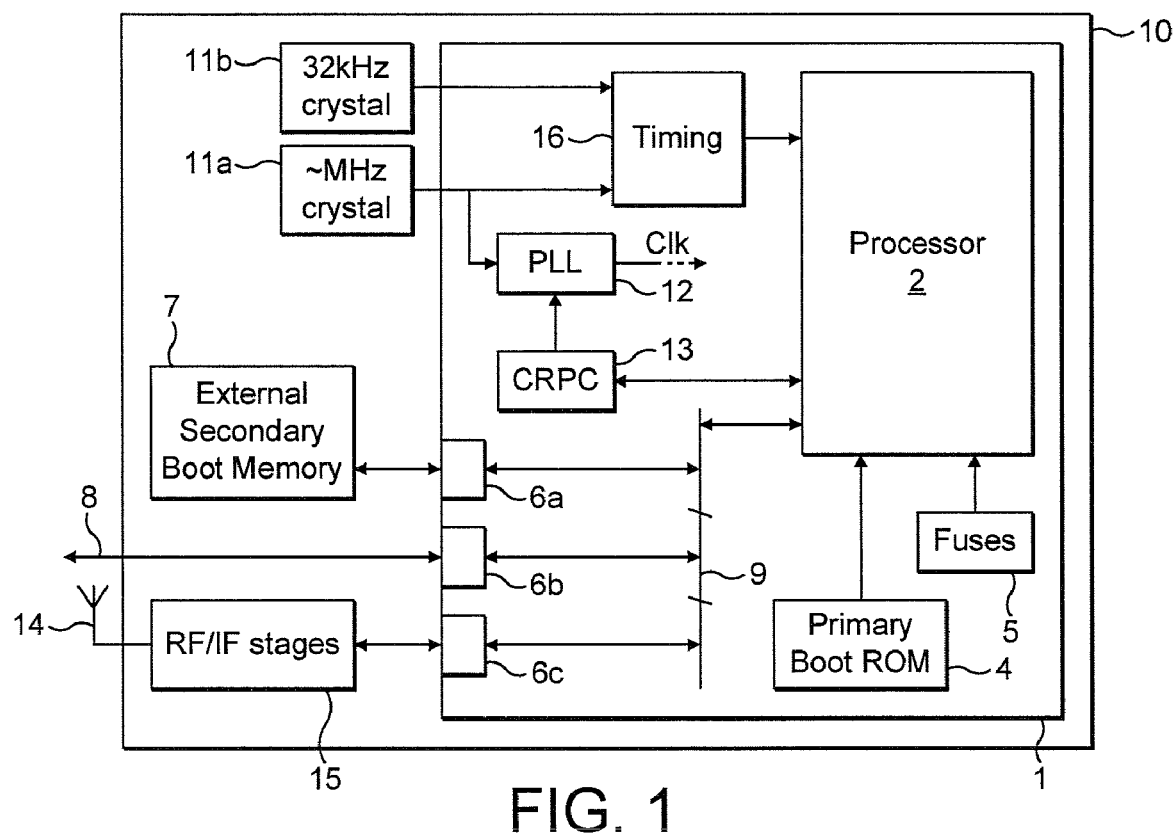
FIG. 1 is a schematic block diagram of a processor in a user device.

An example application of the present invention is now described with reference to FIG. 1 which shows schematically a user device 10, preferably a mobile terminal or other wireless device such as a mobile phone, laptop wireless data card, PDA, etc. The device 10 comprises an integrated circuit 1 having a processor 2 configured as a software modem or "soft modem" for communicating over a wireless cellular network. The principle behind software modem is to perform a significant portion of the signal processing and associated functions required for the wireless communications in a generic, programmable, reconfigurable processor, rather than in dedicated hardware.

The integrated circuit 1 comprises an RF interface 6c, and the device 10 comprises front-end hardware 15 coupled to the RF interface 6c and at least one antenna 14 coupled to the front-end 15. Preferably, the processor 2 is programmed as a soft baseband modem, with the front-end 15 comprising the RF (radio frequency) and IF (intermediate frequency) stages. That is, on the receive side, all the radio functionality from receiving RF signals from the antenna 14 up to and including mixing down to baseband is implemented in dedicated front-end hardware 15. Similarly, on the transmit side, all the functionality from mixing up from baseband to outputting RF signals to the antenna 14 is implemented in dedicated front-end hardware 15. However, all functionality in the baseband domain is implemented in software stored in a memory and executed by the processor 2. While this is a preferred implementation, solutions where the RF/IF stage is not implemented by dedicated hardware are also envisaged.

In the preferred implementation, the dedicated hardware in the receive part of the front-end 15 may comprise a low noise amplifier, (LNA), mixers for downconversion of the received RF signals to IF and for downconversion from IF to baseband, RF and IF filter stages, and an analogue to digital conversion (ADC) stage. An ADC is provided on each of in-phase and quadrature baseband branches for each of a plurality of receive diversity branches. The dedicated hardware in the transmit part of the front-end 15 may comprise a digital to analogue conversion (DAC stage, mixers for upconversion of the baseband signals to IF and for upconversion from IF to RF, RF and IF filter stages, and a power amplifier (PA). The interface 6c may be an analogue RF interface or a digital radio interface such as a DigRF interface. Details of the required hardware for performing these radio functions will be known to a person skilled in the art.

The software may then handle functions such as modulation and demodulation, interleaving and deinterleaving, rate matching and dematching, channel estimation, equalisation, rake processing, bit log-likelihood ratio (LLR) calculation, transmit diversity processing, receive diversity processing, multiple transmit and receive antenna (MIMO) processing, voice codecs, link adaptation through power control or adaptive modulation and coding, and cell measurements.

In a preferred embodiment, the chip used is made by Icera and sold under the trade name Livanto®. Such a chip has a specialised processor platform described for example in WO2006/117562.

An advantage of a soft modem type system is that it can be programmed and potentially reprogrammed to handle different protocols, algorithms, functions, radio access technologies and the like. For example, conventionally different radio access technologies would require different dedicated hardware to be included on a phone or other wireless terminal, and a terminal adapted to handle multiple radio access technologies or "multimode" terminal would have to include different sets of dedicated hardware. This problem is solved by software modem techniques, in which the differences in communicating according to different radio access technologies are handled in software. The processor could be programmed to handle both 2G and 3G cellular standards, including for example perhaps one or more of the GSM, UMTS, EDGE, High Speed Downlink Packet Access (HSDPA), and High Speed Uplink Packet Access (HSUPA), and 3GPP Long Term Evolution (LTE) standards.

Alternatively or additionally, the use of software modem techniques may allow a maker or designer of a user device 10, or a manufacturer or distributor of the chip 1, to take a batch of generic or "standard agnostic" processors and then program them according to different radio standards or technologies for different customers or purposes. A soft modem could also be updated easily and inexpensively by reprogramming it to handle new or different technologies.

Thus given the range of potential applications and customers (i.e. makers of the devices in which the chip 1 could be used), it would be advantageous if the design of the chip 1 was as flexible and "future-proof" as possible. One aspect of this would be to allow customers a choice in the crystal oscillator they use as a reference for their main clock, without having to specifically tailor a batch of chips for each customer's crystal. For example, a maker of a low-end mobile phone may want to use a cheaper, lower frequency oscillator, whereas in a higher-end application a more expensive, higher frequency oscillator may be required. Further, it may be desirable for a customer to be able to change their design at a later stage, e.g. if a cheaper or more accurate crystal becomes available.

According to the following embodiment of the present invention, an improved circuit is provided in which the processor's boot code automatically detects the frequency of the crystal to which the chip 1 is connected, and adjusts its PLL accordingly. This means a manufacturer of a device 10 can simply connect up their required crystal without having to order or re-order a batch of chips specifically tailored to that crystal, and without having to worry about configuring the PLL themselves.

The device 10 comprises a first crystal oscillator 11a having an initially unknown frequency, and a second crystal oscillator 11b having a fixed, known frequency (within known error margins). The frequency of the second oscillator may for example be of the order of tens of kHz, and in the preferred example is 32 kHz. The frequency of the first oscillator can take a range of values, but may be of the order of tens of MHz. In the preferred example the first crystal is selected from a group having frequencies of 15.36 MHz, 19.2 MHz, 26.0 MHz, 38.4 MHz and 52 MHz.

The second oscillator is in fact preferably part of a real-time clock (RTC). That is, a clock for measuring "human time", conventionally in seconds, minutes and/or hours, i.e. in a unit of time that is comprehensible on a human scale. This is in contrast with the first oscillator which is for clocking the processor 2 and/or other circuitry of the chip 1, to govern digital logic. Real-time reference oscillators typically have a frequency of an integer power of two oscillations per second, i.e. $2^n$ oscillations per second where n is an integer, because this is most convenient for dividing down to a unit of one second. Most common is 32.786 kHz, which is $2^{15}$ oscillations per second.

Each of the first oscillator 11a and second oscillator 11b is operatively coupled to timing circuitry 16, preferably a set of internal timers. The timing circuitry 16 is in turn coupled to the processor 2.

The IC 1 further comprises a PLL 12 and a Clock, Reset and Power Control (CRPC) block 13. The output of the first oscillator 11a is coupled to a reference input of the PLL 12, preferably via a squarer (not shown). The CRPC block 13 is coupled to a control input of the PLL 12. The CRPC block 13 comprises a set of memory addressable registers coupled to the processor 12 which are used to set clock settings for the chip 1, including the multiplication factor of the PLL 12.

In addition for example, the IC 1 may comprise an on-chip primary boot ROM 4 storing primary boot code, external interfaces 6a and 6b, and a system interconnect 9. The IC 1 may also comprise a permanent, one-time writeable memory, in this case in the form of a bank of fuse latches 5. These are fuses such as electronic fuses (E-fuses) which can be programmed by fusing selected fuses using an electric signal, or laser fuses which can be programmed by fusing selected fuses with a laser. Further, the device 10 may comprise one or more external memories 7 which may store secondary boot code, one or more external serial links 8 such as a UART link (universal asynchronous receiver/transmitter) which may act as a source of secondary boot code. The serial link 8 is for linking to other devices external to the device 10. The processor 9 is coupled to the external interfaces 6a and 6b and RF interface 6c via the system interconnect 9. The processor 2 is also coupled to the primary boot ROM 4 and fuse latches 5.

In a preferred embodiment, the PLL 12 is the main or "master" clock for the IC 1, such that its clock output is coupled to most or all other clocked components of the IC 1 including the processor 2, albeit perhaps coupled to some parts of the processor or the rest of the circuit via one or more dividers and/or one or more branches. In one embodiment, the radio interface 6c comprises a digital interface such as a DigRF interface, and the PLL is arranged to clock all clocked components on the chip 1 except the DigRF interface.

In operation, the first crystal oscillator 11a independently generates a substantially constant oscillating reference signal (the first reference signal) which it supplies from its output to the reference input of the PLL 12. The first reference signal will be initially generated in sinusoidal form but will be squared at some point, whether in circuitry in the oscillator 11a, elsewhere between the oscillator 11 and processor 2, in circuitry at the input pad to the processor 2, or in the PLL 12 itself.

The PLL 12 generates a clock signal by reference to the first reference signal. The factor by which the PLL 12 multiplies the first reference signal is controllable by a register in the CRPC 13, but will typically be of the order of 20 MHz to 1 GHz in a preferred embodiment, i.e. perhaps one or two orders of magnitude higher than the frequency of the first reference signal.

The CRPC 13 outputs a setting indicative of the factor from the relevant one of its registers to the control input of the PLL 12. The CPRC's registers are memory addressable so the setting can be written to the relevant register in the CRPC 13 by the processor 2 under control of software being executed thereon. Thus the frequency of the output clock of the PLL 12 relative to the first reference frequency is set by software, and in particular by boot code.

A particular advantage of the described arrangement is that it re-uses circuitry that may exist for other reasons, in which case no special extra hardware may be needed to support the discovery of the frequency first crystal oscillator 11a. As mentioned, the (nominally) known frequency of the second crystal oscillator 11b is preferably part of the real-time clock. Such crystals are typically not very accurate and so need to be calibrated, which is done by reference to the frequency of the first crystal 11a which is more accurate. The calibration means may comprise the timing circuitry 16, and/or software in the boot configuration code.

Although the frequency of the first crystal 11a is more accurate, in the present case the choice of first crystal 11a is initially unknown. But the inventors have recognised that the real-time clock's crystal 11b is accurate enough that it is possible to perform a "reverse" calibration to make a reasonably good decision about the frequency of the unknown first crystal 11a. So the frequency of the first crystal 11a is discovered by reference to the nominally known (but inaccurate) frequency of the second crystal 11b. Preferably this is achievable because the choice of frequency of the first crystal 11a is quantised onto a predetermined set of sufficiently widely spaced known values, i.e. widely spaced relative to the accuracy of the second crystal 11b. In practice, these frequencies can be quite closely spaced, for example about 2 to 5 kHz (e.g. the first crystal is chosen from a set having frequencies of 15.36 MHz, 19.2 MHz, 26.0 MHz, 38.4 MHz and 52 MHz.) The discovery algorithm in the boot code then determines the first frequency by comparing the result as measured by reference to the second frequency against knowledge of the predetermined set, and selecting which ever is closer.

After the frequency of the first crystal oscillator 11a has been discovered, its frequency can be assumed to be relatively accurate relative to that of the second crystal oscillator 11b, and the real-time clock can be calibrated by reference to the frequency of the first crystal oscillator 11a.

Figure 2:
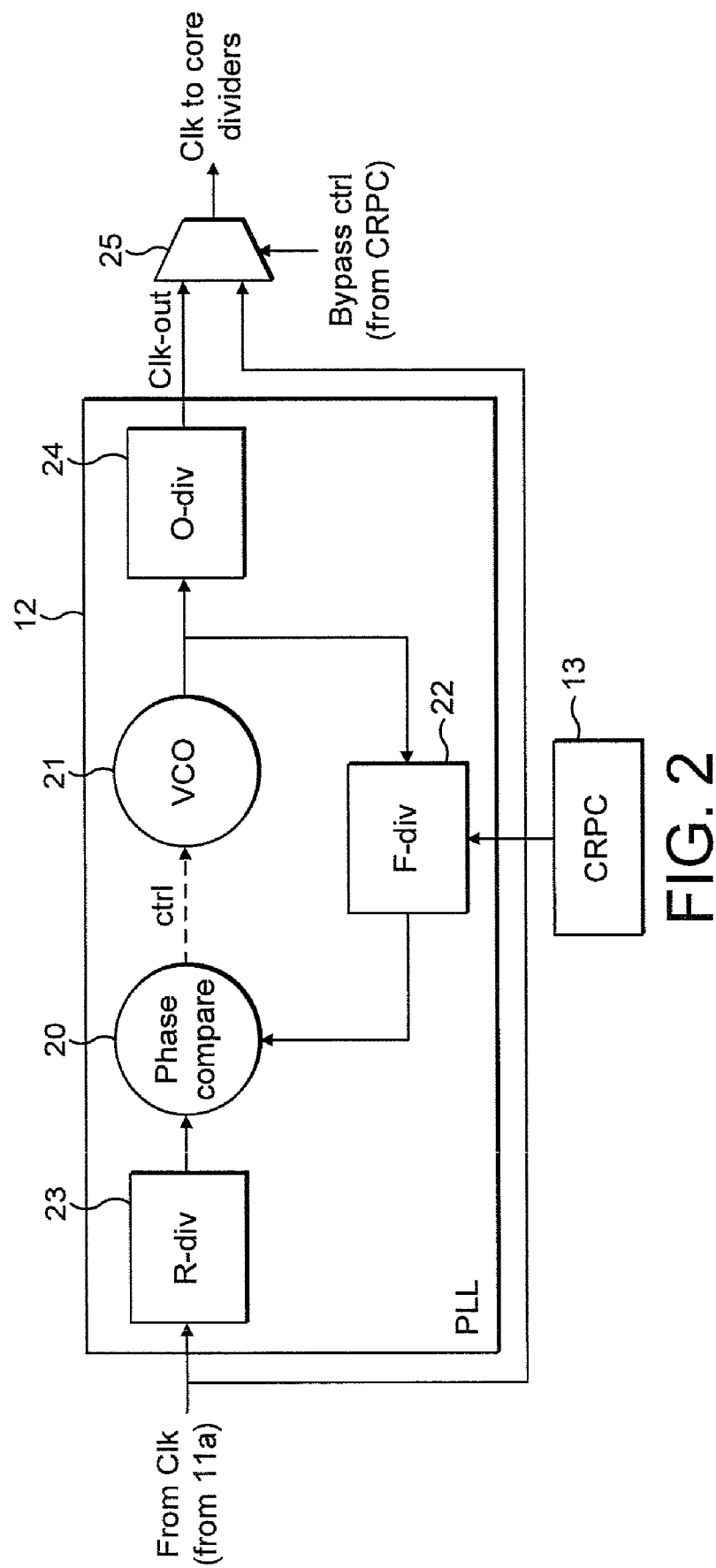
FIG. 2 is a schematic block diagram of a PLL and associated circuitry.

An example of a software controllable PLL 12 is described in more detail in relation to the schematic diagram of FIG. 2. This comprises a phase comparison block 20, an output clock 21, and a variable clock divider 22 arranged as a feedback divider (F-div). The phase comparison block has a reference input coupled to the output of the first crystal oscillator 11a. The output of the phase comparison block is coupled to a control input of the output clock 21, which is a voltage controlled oscillator (VCO). As well as being coupled onwards to all of the relevant clocked components of the chip 1, the output of the output clock 21 is coupled to the input of the variable clock divider 22. The output of the appropriate register of the CRPC 13 is coupled to a control input of the variable divider 22. The output of the variable divider 22 is coupled to the other input of the phase comparison block 20.

The output clock 21 generates an output clock signal. This is fed back through the divider which divides its frequency by the factor N set by the CRPC 13. The comparison block 20 compares the phase of the divided clock signal with the phase of the reference signal from the first oscillator 11a, and generates a control signal dependent on the error between the two compared signals. This control signal is supplied to the control input of the output clock 21, controlling it to adjust its output frequency accordingly depending on the error between the divided signal and the reference signal. By this feedback loop, the output frequency is held at N times the reference signal. And because the factor N is controlled by the setting supplied to the divider from a register written to by software, then the output clock frequency relative to the reference frequency is controllable by software.

The chip is configured such that in operation, when the chip is either turned on or reset, the processor 2 automatically fetches and executes primary boot code from the on-chip primary boot ROM 4. Preferably, amongst other basic boot code for basic initialisation of the processor as will be familiar to a person skilled in the art, the primary boot code also contains clock configuration code for providing the above-mentioned setting to the CRPC 13, thus configuring the PLL 12. When the clock configuration code is executed by the processor upon booting, it writes the factor to the relevant register of the CRPC 13.

There may also be an input divider (R-div) 23 coupled to the input and an output divider (O-div) 24 coupled to the output of the PLL. But in the described embodiment, this PLL is used to multiply up to generate higher frequencies.

Note, before the factor is set by the boot code, the processor 2 may be arranged to operate at some initial default speed. Preferarably there is a bypass mechanism 25 for the PLL clock so that the dividers for the internal clocks can be driven directly from the first crystal 11a. This means the processor can run immediately, before the PLL is running, although it may have to be run slowly until it has been determined how the PLL should be configured and the PLL has been locked. The PLL is then switched in, so the primary boot can complete as quickly as possible.

The processor may also boot using secondary boot code fetched from an external source such as external memory 7 (e.g. a NAND flash) within the same device 10 or an external link such as serial link 8 to a source external to the device. However, in a preferred embodiment the clock configuration code is implemented in the primary boot code on chip, in the ROM 4.

The boot code determines the PLL setting by reference to the second reference oscillator 11b as follows. The second reference oscillator 11b independently generates a substantially constant oscillating reference signal (the second reference signal) which it supplies from its output to the timing circuitry 16. Similarly to the first reference signal, the second reference signal is preferably generated initially in sinusoidal form but will be squared at some point. However, unlike the first reference signal, the frequency of the second reference signal is predetermined, i.e. it is fixed and known (within certain error margins) from the perspective of the boot code. The person writing the boot code knows the frequency of the second reference oscillator 11b in advance, but not the frequency of the first oscillator 11a which is the choice of the customer.

The first reference oscillator 11a also supplies its reference signal (the first reference signal) to the timing circuitry 16. When executed by the processor, the clock configuration code in the boot code operates the processor 2 to compare the timing of the first and second reference signals using the timing circuitry 16 by timing the first reference signal off against the second reference signal. The boot code thus operates the processor 2 to detect the frequency of the first reference signal by reference to the second reference signal, and therefore discover the frequency of the first reference oscillator 11a.

The boot code then determines the PLL setting based on the discovered frequency. In a preferred embodiment, this is achieved by means of a look-up table. Once the boot code has discovered the frequency of the first reference signal, it looks this up in the table, which for each of a plurality of possible frequencies specifies the respective corresponding setting needed to configure the PLL 12 to output a certain desired clock frequency. The boot code then writes this setting to the CRPC 13, and thus configures the PLL 12 accordingly.

In a preferred embodiment, the processor may be selectively configurable to operate in different modes: a "discovery mode" whereby the boot code configures the PLL 12 based on the detected reference frequency as described above, and a "fused mode" whereby the boot code configures the PLL 12 based on a value written to the fuse latches 5. The mode itself is preferably indicated on manufacture by fusing another bit in the fuse latches 5, but could potentially be indicated by any suitable means such as by an external pin.

In a preferred embodiment of the fused mode, the boot code makes use of the same look-up table as in the discovery mode. That is, the boot code reads the relevant fuses in the bank 5, looks up the value in those fuses in the look-up table, and reads off the corresponding PLL setting which it then writes to the relevant register in the CRPC 13.

There is a trade-off between discovering the frequency or simply specifying it in the fuses. The discovery mode is slower to boot but more flexible, whilst the fused mode is faster to boot but less flexible. Given this trade-off, it is therefore advantageous to allow a choice between the two modes.

It will be appreciated that the above embodiments are described only by way of example. In other embodiments for instance, although the above has been described in terms of configuring a single master PLL, the invention could be used to configure other PLLs. For example, in one embodiment of the invention the boot code could configure a separate PLL connected to clock the RF interface 6c. This is particularly relevant in the case of a DigRF interface which is clocked by a separate PLL, which is typically higher frequency than the main master PLL used to clock the processor 2. This separate PLL could alternatively or additionally be configured by the boot code in accordance with the present invention. Or in general, where a circuit comprises multiple PLLs, then any, some or all of them could be configured by the boot code. E.g. the look-up table could store a respective set of configuration values for the each possible crystal frequency, with each set comprising a configuration for each of the PLLs. Further, the invention is not limited to the example application of a soft-modem as described above, but could apply to any circuit having a processor. Further, other types of reference oscillator may be used, and different frequencies of the reference oscillators and/or PLLs may be used other than those given by way of example above. Further, other variations on the clock circuitry may be possible other than the PLL described in the example above. Further, although the above discovery code has been described as using a look-up table, other alternatives could be used such as an algorithm which converts first frequency to a required factor. Other applications and configurations may be apparent to the person skilled in the art given the disclosure herein. The scope of the invention is not limited by the described embodiments, but only by the following claims.

In particular the method can comprise the following steps.

The generating of the second reference signal comprises generating a reference signal for a real-time clock for measuring time in seconds, by generating the second reference signal with a frequency of $2^n$ oscillations per second where n is an integer.

Calibrating the real-time clock by determining the frequency of the second reference signal to a greater accuracy than initially known by reference to the determined frequency of the first reference signal.

The frequency of the first reference signal is one of a predetermined set of quantised values, and said determination of the frequency of the first reference signal comprises determining the frequency of the first reference signal by reference to the set of quantised values.

The quantisation is spaced more widely than the initially known accuracy of the frequency of the second reference signal.

The second reference signal is generated with a lower frequency than the first reference signal.

The second reference signal is generated with a frequency at least ten times lower than the frequency of the first reference signal.

The frequency of the second reference signal is nominally 32.768 kHz.

Generating by reference to the first reference signal a clock signal having a frequency greater than the frequency of the first reference signal by a controllable factor, wherein the execution of the clock configuration code comprises setting said factor in dependence on the determined frequency of the first reference signal.

At least one fuse latch is coupled to the processor for storing an indication of the frequency of the first reference signal, the processor being operable in a selected one of: a fused mode of operation in which said factor is determined by an indication written into said at least one fuse latch, and a discovery mode of operation in which the factor is determined by reference to the second reference signal; and the method comprises selecting the discovery mode.

Generating the first reference signal from a reference oscillator mounted externally to a chip on which the processor is integrated, and the generation of the clock signal is performed on said chip.

Retrieving said boot code from a boot ROM on said chip.

Supplying the clock signal as the master clock signal for the chip.

Using the clock signal to clock the processor.

A radio interface is coupled to the processor for communicating over a wireless cellular network, and the method comprises using the clock signal to clock the radio interface.

The execution of the boot code comprises configuring the processor for communicating over the wireless network via said radio interface.

The generation of the clock signal is performed using a phase-locked loop.

The clock signal is generated with a frequency at least ten times the frequency of the first reference signal.

The setting of said factor comprises writing the factor to an addressable register in dependence on the determined first frequency.

Generating the first reference signal from a first independently oscillating oscillator.

Generating the first reference signal from a first crystal oscillator.

The generation of the second reference signal is from a second independently oscillating oscillator.

The generation of the second reference signal is from a second crystal oscillator.

The processor is coupled to the first and second reference oscillators by timing circuitry and the determination of the frequency of the first reference signal by reference to the second reference signal comprises using the timing circuitry.

What is claimed is:

1. A circuit for determining the frequency of a first oscillating reference signal generated by a first independently-oscillating reference oscillator, the circuit comprising:
    a boot memory storing boot code comprising clock configuration code; and
    a real-time clock for measuring time in seconds, the real-time clock comprising a second independently-oscillating reference oscillator arranged to generate a second oscillating reference signal having a known frequency, and the real-time clock being arranged to use the frequency of the second reference signal as a reference, the frequency of the second reference signal being $2^n$ oscillations per second where n is an integer;
    a processor coupled to the boot memory and the second reference oscillator, arranged to execute the boot code from the boot memory upon booting, wherein when executed the clock configuration code operates the processor to discover the frequency of the first reference signal by reference to the second reference signal;
    wherein the frequency of the first reference signal is one of a predetermined set of quantised values spaced more widely than an initially known accuracy of the frequency of the second reference signal, and the clock configuration code discovers the frequency of the first reference signal by reference to the set of quantised values; and
    wherein the circuit further comprises calibration means arranged, after the frequency of the first reference signal has been discovered, to calibrate the real-time clock by determining the frequency of the second reference signal to a greater accuracy than initially known by reference to the discovered frequency of the first reference signal.

2. The circuit of claim 1, wherein the frequency of the second reference signal is lower than the frequency of the first reference signal.

3. The circuit of claim 1, wherein the frequency of the second reference signal is at least ten times lower than the frequency of the first reference signal.

4. The circuit of claim 1, wherein the frequency of the second reference signal is nominally 32.768kHz.

5. The circuit of claim 1, comprising clock circuitry arranged to generate by reference to the first reference signal a clock signal having a frequency greater than the frequency of the first reference signal by a controllable factor;
    wherein when executed the clock configuration code operates the processor to set said factor in dependence on the discovered frequency of the first reference signal.

6. The circuit of claim 5, comprising at least one fuse latch coupled to the processor for storing an indication of the frequency of the first reference signal; and selection means coupled to the processor, the selection means being arranged to configure the processor into a selected one of: a fused mode of operation in which said factor is determined by an indication written into said at least one fuse latch, and a discovery mode of operation in which the factor is determined by reference to the second reference signal.

7. The circuit of claim 5, wherein at least the clock circuitry and processor are integrated onto the same chip, and at least the first reference oscillator is mounted externally to the chip.

8. The circuit of claim 7, wherein the boot memory comprises an on-chip boot ROM storing said boot code.

9. The circuit of claim 7, wherein the clock circuitry is connected as the master clock for the chip.

10. The circuit of claim 5, wherein the clock circuitry is arranged to clock the processor using said clock signal.

11. The circuit of claim 5, comprising a radio interface coupled to the processor for communicating over a wireless cellular network, wherein the clock circuitry is arranged to clock the radio interface using said clock signal.

12. The circuit of claim 11, wherein the boot code comprises code for configuring the processor for communicating over the wireless network via said radio interface.

13. The circuit of claim 5, wherein the clock circuitry comprises a phase-locked loop.

14. The circuit of to claim 5, wherein the frequency of the clock signal is at least ten times the frequency of the first reference signal.

15. The circuit of claim 5, wherein the clock circuitry comprises an addressable register for setting said factor, and when executed the clock configuration code operates the processor to write said factor to the register in dependence on the determined first frequency.

16. The circuit of claim 1, wherein the first reference oscillator is a crystal oscillator.

17. The circuit of claim 1, wherein the second reference oscillator is a crystal oscillator.

18. The circuit of claim 1, comprising timing circuitry by which the processor is coupled to the first and second reference oscillators, wherein when executed the clock configuration code operates the processor to discover the frequency of the first reference signal by reference to the second reference signal using the timing circuitry.

19. A method of determining the frequency of a first oscillating reference signal generated by a first independently-oscillating reference oscillator, configuring clock circuitry, the method comprising:
    from a second independently-oscillating reference oscillator, generating a second oscillating reference signal having a second known frequency, wherein the generating of the second reference signal comprises generating a reference signal for a real-time clock for measuring time in seconds, by generating the second reference signal with a frequency of $2^n$ oscillations per second where n is an integer; and
    executing boot code upon booting a processor, wherein the execution of the boot code comprises executing clock configuration code to determine the frequency of the first reference signal by reference to the second reference signal;
    wherein the frequency of the first reference signal is one of a predetermined set of quantised values spaced more widely than an initially known accuracy of the frequency of the second reference signal, and said discovery of the frequency of the first reference signal comprises discovering the frequency of the first reference signal by reference to the set of quantised values; and
    the method further comprises, after the frequency of the first reference signal has been discovered, calibrating the real-time clock by determining the frequency of the second reference signal to a greater accuracy than initially known by reference to the discovered frequency of the first reference signal.

20. A processor chip comprising:
an input for receiving a first oscillating reference signal having a first frequency from a first independently-oscillating reference oscillator;
an input for receiving a second oscillating reference signal having a second, known frequency from a second independently-oscillating reference oscillator;
a boot memory storing boot code comprising clock configuration code;
a real-time clock for measuring time in seconds, being arranged to use the frequency of the first reference signal as a reference, the frequency of the second reference signal being $2^n$ oscillations per second where n is an integer; and
an execution unit coupled to the boot memory and said inputs, arranged to execute the boot code from the boot memory upon booting, wherein when executed the clock configuration code operates the processor to discover the first frequency by reference to the second reference signal;
wherein the frequency of the first reference signal is one of a predetermined set of quantised values spaced more widely than an initially known accuracy of the frequency of the second reference signal, and the clock configuration code discovers the frequency of the first reference signal by reference to the set of quantised values; and
wherein the chip further comprises calibration means arranged, after the frequency of the first reference signal has been discovered, to calibrate the real-time clock by determining the frequency of the second reference signal to a greater accuracy than initially known by reference to the discovered frequency of the first reference signal.

21. A user equipment comprising:
a first independently oscillating reference oscillator arranged to generate a first oscillating reference signal having a first frequency;
a real-time clock for measuring time in seconds, the real-time clock comprising a second reference oscillator arranged to generate a second oscillating reference signal having a second, known frequency, and the real-time clock being arranged to use the frequency of the first signal as a reference, and the frequency of the second reference signal being $2^n$ oscillations per second where n is an integer;
a boot memory storing boot code comprising clock configuration code;
a processor coupled to the boot memory, first reference oscillator and second reference oscillator, arranged to execute the boot code from the boot memory upon booting, wherein when executed the clock configuration code operates the processor to determine the first frequency by reference to the second reference signal;
wherein the frequency of the first reference signal is one of a predetermined set of quantised values spaced more widely than an initially known accuracy of the frequency of the second reference signal, and the clock configuration code discovers the frequency of the first reference signal by reference to the set of quantised values; and
wherein the circuit further comprises calibration means arranged, after the frequency of the first reference signal has been discovered, to calibrate the real-time clock by determining the frequency of the second reference signal to a greater accuracy than initially known by reference to the discovered frequency of the first reference signal.

22. A boot code product for determining the frequency of a first oscillating reference signal generated by a first independently-oscillating reference oscillator, the boot code comprising code which when executed on a processor performs the steps of:
booting the processor; and
as part of the booting, discovering the frequency of the first reference signal by reference to a second oscillating reference signal having a second, known frequency generated by a second independently-oscillating reference oscillator;
wherein the second reference oscillator is part of a real-time clock for measuring time in seconds, the real-time clock being arranged to use the frequency of the second reference signal as a reference, the frequency of the second reference signal being $2^n$ oscillations per second where n is an integer;
wherein the frequency of the first reference signal is one of a predetermined set of quantised values spaced more widely than an initially known accuracy of the frequency of the second reference signal, and said discovery of the frequency of the first reference signal comprises discovering the frequency of the first reference signal by reference to the set of quantised values; and
the clock configuration code is arranged, after the frequency of the first reference signal has been discovered, to calibrate the real-time clock by determining the frequency of the second reference signal to a greater accuracy than initially known by reference to the discovered frequency of the first reference signal.

23. The circuit of claim 1, wherein the first and second reference oscillators comprise respective crystal oscillators.

24. The method of claim 19, wherein the first and second reference oscillators comprise respective crystal oscillators.

25. The circuit of claim 1, wherein the second reference oscillator is less accurate than the first reference oscillator.

26. The circuit of claim 16 wherein the frequency of the first signal is the frequency of the first crystal oscillator, the crystal oscillator being selected from a group having the frequencies of said predetermined, and wherein the clock configuration code discovers the frequency of the first crystal oscillator.

27. The method of claim 19, wherein the second reference oscillator is less accurate than the first reference oscillator.

28. The method of claim 19, wherein the first reference oscillator is a first crystal oscillator and the second reference oscillator is a second crystal oscillator.

29. The method of claim 28, wherein the frequency of the first signal is the frequency of the first crystal oscillator, the crystal oscillator being selected from a group having the frequencies of said predetermined, and the discovery comprises discovering the frequency of the first crystal oscillator.

* * * * *